United States Patent

[11] 3,618,037

[72] Inventors James E. Wollum
Glendora;
Millard J. Arvig, San Gabriel, both of Calif.

[21] Appl. No. 859,536
[22] Filed Sept. 19, 1969
[45] Patented Nov. 2, 1971
[73] Assignee Burroughs Corporation
Detroit, Mich.

[54] DIGITAL DATA COMMUNICATION MULTIPLE LINE CONTROL
12 Claims, 11 Drawing Figs.

[52] U.S. Cl. ........ 340/172.5
[51] Int. Cl. ........ G06f 3/04
[50] Field of Search ........ 340/172.5

[56] References Cited

UNITED STATES PATENTS

| | | | |
|---|---|---|---|
| 3,202,972 | 8/1965 | Stafford et al. ........ | 340/172.5 |
| 3,312,950 | 4/1967 | Hillman et al. ........ | 340/172.5 |
| 3,337,855 | 8/1967 | Richard et al. ........ | 340/172.5 |
| 3,413,612 | 11/1968 | Brooks et al. ........ | 340/172.5 |

*Primary Examiner*—Gareth D. Shaw
*Assistant Examiner*—Harvey E. Springborn
*Attorney*—Christie, Parker & Hale

ABSTRACT: There is described a control unit for buffering a plurality of digital data communication lines with a data processor on a time-shared basis, where each communication line may be operating with a different line discipline. All buffering functions for each communication line are under control of a stored word. The stored control words, together with each of the associated communication line adapter terminals, are continuously scanned and logic circuitry, in response to each control word when scanned, determines the status of the communication and modifies the control word if the status has changed. Timing functions for all communication lines are derived, also on a time-shared basis, from a single real-time clock. The processor can monitor each control word during each scan to change the status of the communication operation with the associated line and to sense interrupt conditions requiring attention.

INVENTORS.
JAMES E. WOLLUM
MILLARD J. ARVIG
BY
Christie, Parker & Hale
ATTORNEYS

PATENTED NOV 2 1971 3,618,037

SHEET 4 OF 9

DIGITAL DATA COMMUNICATION MULTIPLE LINE CONTROL

FIELD OF THE INVENTION

This invention relates to digital data communication systems for digital computers, and more particularly, is concerned with controlling the transfer of data between a plurality of communication lines and a processor on a real-time basis.

PRIOR ART

The transmission of digitized information between a remote station and a centralized digital computer system over a communication link, such as a telephone line, is well known. A number of different types of systems for transmitting digitized data are available on the market. Such equipment for modulating and demodulating digitized information for transmission over telephone lines or other types of communication links are referred to as modems or data sets. Some systems are asynchronous in operation and others are synchronous. The rate at which digitized bits are transmitted, referred to as the baud rate for different types of systems, may vary over a wide range of frequencies. The number of bits per character, as well as the pattern of bits identifying the beginning and ending of a character, may vary.

It has been the practice heretofore to provide special line adapter equipment for each type of data communication line. The line adapter equipment was designed to provide the interface control and buffering for one type of line discipline, message format, and character format. Each line adapter included its own timing for a specific baud rate, as well as its own control of various timeouts or delays required to properly service the particular type of line for which the adapter equipment is designed. The problem with such an arrangement of course is that the system hardware configuration, once defined and physically set up, can only operate with a specified group of different types of communication line disciplines. If a particular user of the data processing equipment needs to accommodate a new data communication device not falling in the dedicated group, a new hardware design is required to be added to the system configuration. The cost of such adapter units is high because each adapter unit requires its own control, timing, and decision-making capabilities.

While some attempt has been made in the past to provide a common control for a plurality of data communication lines, sometimes referred to as multiline control, such systems still required special and relatively expensive line adapters for different types of data sets. Each line adapter must still include some decision-making logic as well as providing all timing functions for the particular equipment with which it is designed to operate. Also the multiline control hardware must be modified each time a new type of communication line and associated adapter are incorporated into the system configuration. Such known multiline control units, while time-sharing some of the control functions, do not continuously scan the line adapters at a constant frame rate. Whenever an adapter requires service, such as transmitting or receiving, or whenever a complete character must be read into or received from the processor, the scan is interrupted for varying periods of time, depending on the particular operation required. This limits the number and operating frequency of the line equipment that can be serviced.

SUMMARY OF THE INVENTION

The present invention is directed to a communication control unit for controlling transfer of digital data between a plurality of data communication lines and a digital processor. While each communication line data set is connected to the control unit through a line adapter, the adapter normally provides no decision-making or control function except to provide a line interface, sense synchronous operation, and to store line levels of all output lines to the data set. The same line adapter can be used for substantially all existing asynchronous or synchronous type of data communication systems. The control unit monitors continuously all the adapters in sequence. A storage unit stores a separate control word for each line adapter. Each control word is read out of storage and returned in synchronism with the monitoring of each line adapter. At the time a control word is read out of storage, it may initiate the transfer of selected portions of the control word between the control unit and processor without interruption of the continuous monitoring process. The control word in combination with the input from the associated line adapter and contents of a clock counter established all conditions necessary to service the output to the line adapter and to write a new, or partially modified, or the same control word back into storage. All timing functions are controlled in response to a single real-time clock by providing each control word with a bit timing filed which is set to a predetermined value at the start of any time interval and is counted down at any selected multiple of the repetition rate at which the particular control word is read out of storage.

BRIEF DESCRIPTION OF THE DRAWINGS

One embodiment of the present invention is shown in the accompanying drawings, wherein.

DETAILED DESCRIPTION

Figures 1, 2:
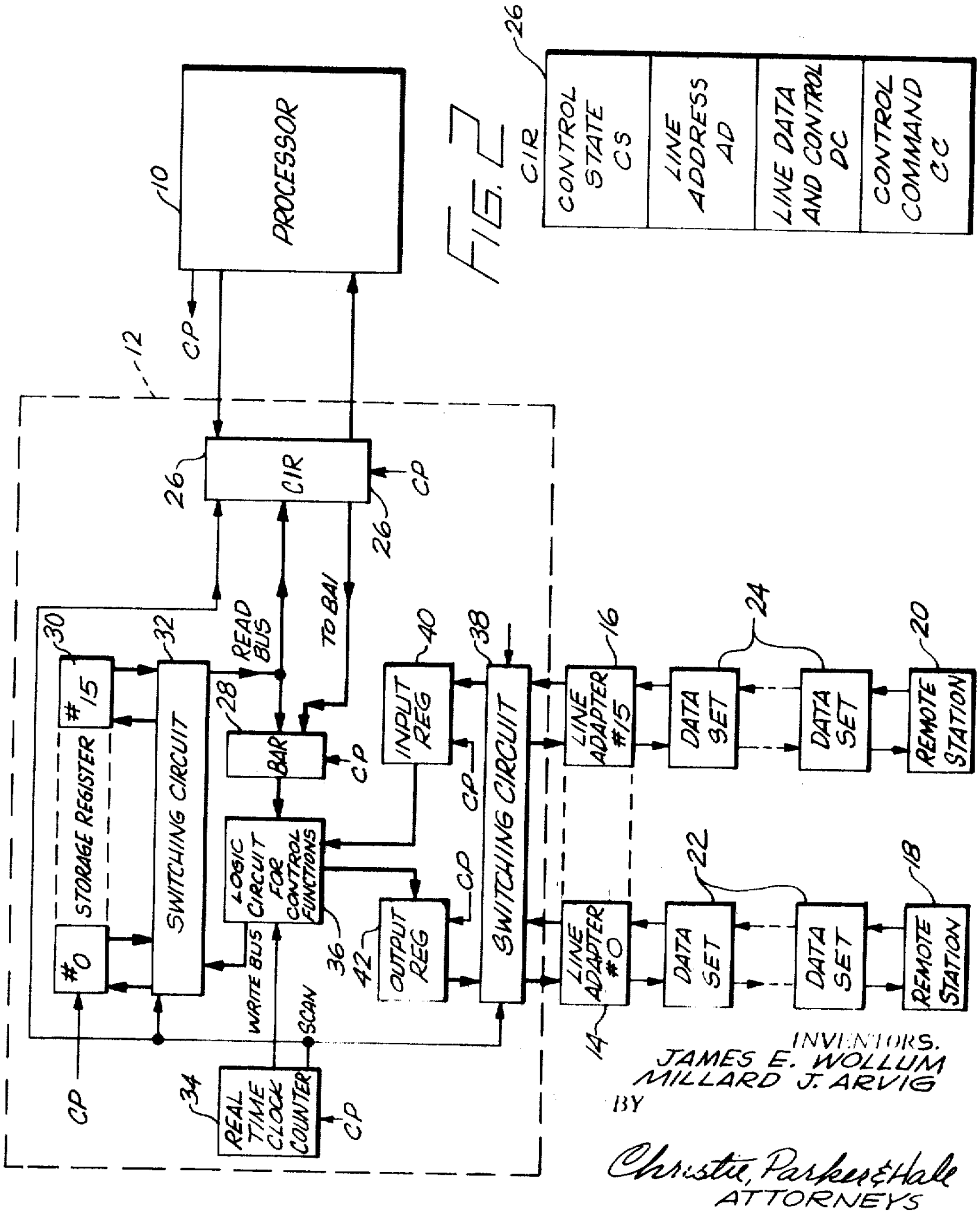
FIG. 1 is a block diagram of the data communication system.

For a more complete understanding of the invention, reference should first be made to FIG. 1 of the accompanying drawings which shows in simplified block form the general organization of the data communication system of the present invention. A digital processor, indicated generally at 10, transmits data to and receives data from an adapter control unit, indicated generally at 12. The adapter control unit 12 in turn transmits data to and receives data from a plurality of line adapters, two of which are indicated at 14 and 16. The number of line adapters connected to the adapter control unit 12 may, for example, be 16 in number. Each line adapter serves an associated remote station, two of which are indicated at 18 and 20. The communication between each of the adapters and its associated remote station may be over standard telephone or teletype equipment using known types of data sets, one communication line pair of data sets being indicated at 22 and a second communication line pair being indicated at 24. One of the features of the present invention is that the control unit can accommodate a large number of different types of communication systems for transmitting digitized data between the remote stations and the processor. There are a number of such commercially available data sets or modems on the market, including both synchronous and asynchronous types.

Figure 5:
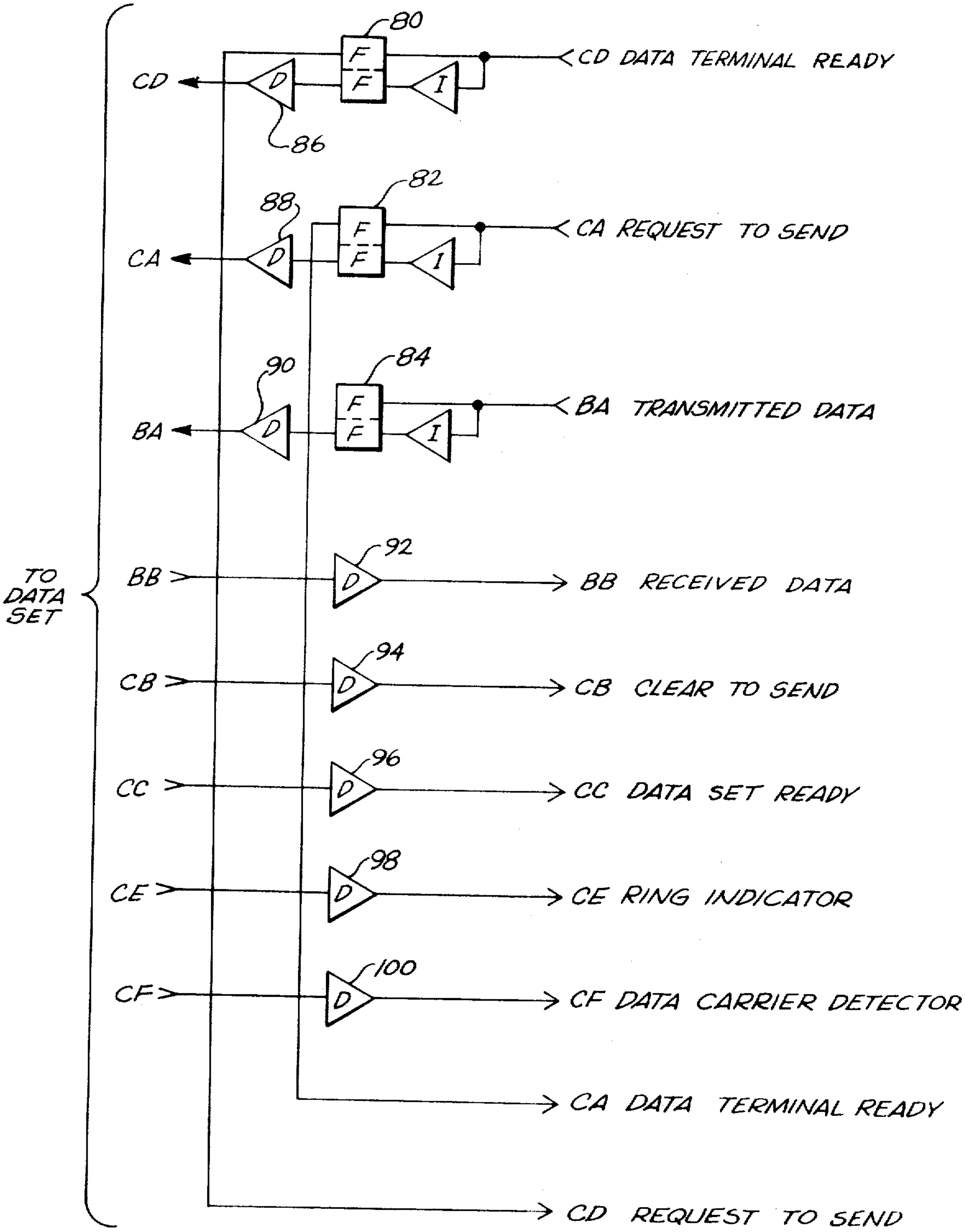
FIG. 5 is a schematic block diagram of a line adapter.

The line adapters, as will hereinafter be more fully described in connection with FIG. 5, merely provide an interface between the adapter control unit 12 and each of the data sets. All control functions are provided by the adapter control unit 12 and are time-shared by the different line adapters. This permits the line adapter circuit to be relatively simple and inexpensive and to accommodate a number of different types of both synchronous and asynchronous digital data communication systems.

The processor 10 communicates with the adapter control unit 12 through a Control Interface Register (CIR) indicated at 26. Information read into the CIR register 26 from the processor 10 is transferred, at the proper time, into a Buffer Associative Register (BAR) 28. The adapter control unit 12 includes a storage register 30 or other memory device having 16 words of storage, one word for each associated line adapter. A switching circuit 32 selectively gates any one of the 16 control words in the storage register 30 to a Read bus which goes to both the CIR 26 and BAR 28. The switching circuit 32 is controlled by the lower order portion of a Real Time (RT) clock counter 34. The scan output from the counter 34 cycles the switching circuit 32 such that, with each clock pulse (CP) of the system clock, successive ones of the 16 control words stored in the storage register 30 are transferred by the Read bus into the BAR and the CIR registers. As a new control word is transferred to the BAR register 28, the previous control word is applied to the Write bus through a logic circuit for all control functions, indicated generally at 36. The Write bus is connected by the switching circuit 32 to successive ones of the word locations in the storage register 30. Thus under operation of the clock counter 34, there is a continuous scanning of the words stored in the storage register through the BAR register 28, the cycle being repeated at sixteen clock pulse intervals.

At the same time, a switching circuit 38, operated in synchronism with the switching circuit 32 by the scan output of the clock counter 34, connects the input and output lines of each of the line adapters, respectively, to an Input register 40 and an Output register 42. The contents of the Input register 40 are applied to the logic circuit 36 and the Output register 42 is in turn set by the logic circuit 36.

From the description thus far it will be seen that communication over each of the lines is controlled by the combination of the contents of the Input register 40 gated from the associated adapter, the BAR register 28 containing the associated control word, and the clock counter 34 by means of the output from the logic circuit 36. Control functions for all lines are carried out on a time-sharing basis, as the adapters and storage registers are continuously scanned at the clock pulse rate.

As shown in FIG. 2, a word stored in the CIR register 26 has four fields. The Control State (CS) field determines the state of the processor interface, i.e., whether the interface is in an idle state (CS=0), occupied with information for the processor (CS=1). or occupied with information for the BAR register (CS=2). The word in the CIR register includes an Adapter Address (AD) field which identifies one of the 16 adapters. The CIR register 26 also includes a Data/Control (DC) filed which either stores data or control information which is being transferred between the processor and the BAR register, or between the storage register 30 and the processor 10. The fourth field in the CIR register 26 is the Control Counter (CC) field which is used to identify various operations, such as the transfer path of the information of the DC field.

Figure 3:
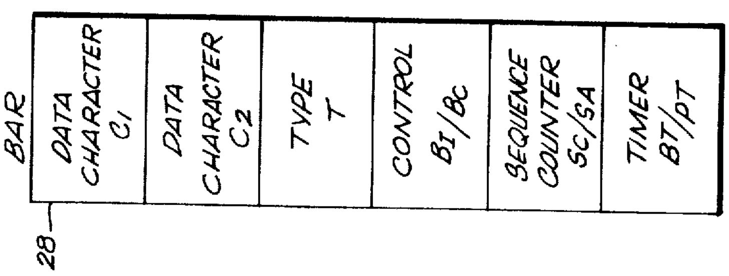
FIGS. 2 and 3 illustrate the word format in two of the registers in the communication control unit.

As shown in FIG. 3, a word stored in the BAR register 28 contains six basic fields. Two fields, designated respectively $C_1$ and $C_2$, store data characters. The third field, designated T, identifies the type of equipment being serviced on a particular communication line. For example there may be a number of possible asynchronous types differing in baud rate from 45.5 up to 9,600 bits per second, in character size from 6 bits up to 11 bits per character, and in the numbers of stop bits per character. Each type is coded and identified in the control unit by the T field. This arrangement permits the customer to select any type of communication equipment he desires to use and to modify the adapter control unit to that equipment merely by loading the corresponding type field from the processor into the associated control word. The same line adapter circuit can be used for all standard asynchronous types of communication systems, as well as a number of standard synchronous type communication systems. By providing different line adapters, the communication system of the present invention can also accommodate other existing types of data communication systems, such as the Touching-Tone 403, Voice Response, Auto-Call 801, and others. In addition, as shown in FIG. 3, the control word stored in the BAR register 28 includes a BI/BC field for storing interrupts for the processor and commands for the cluster control unit. The fifth field, designated SC/SA is for counting sequence operations. The sixth field, designated BT/PT, is for controlling timing operations.

Figure 4:
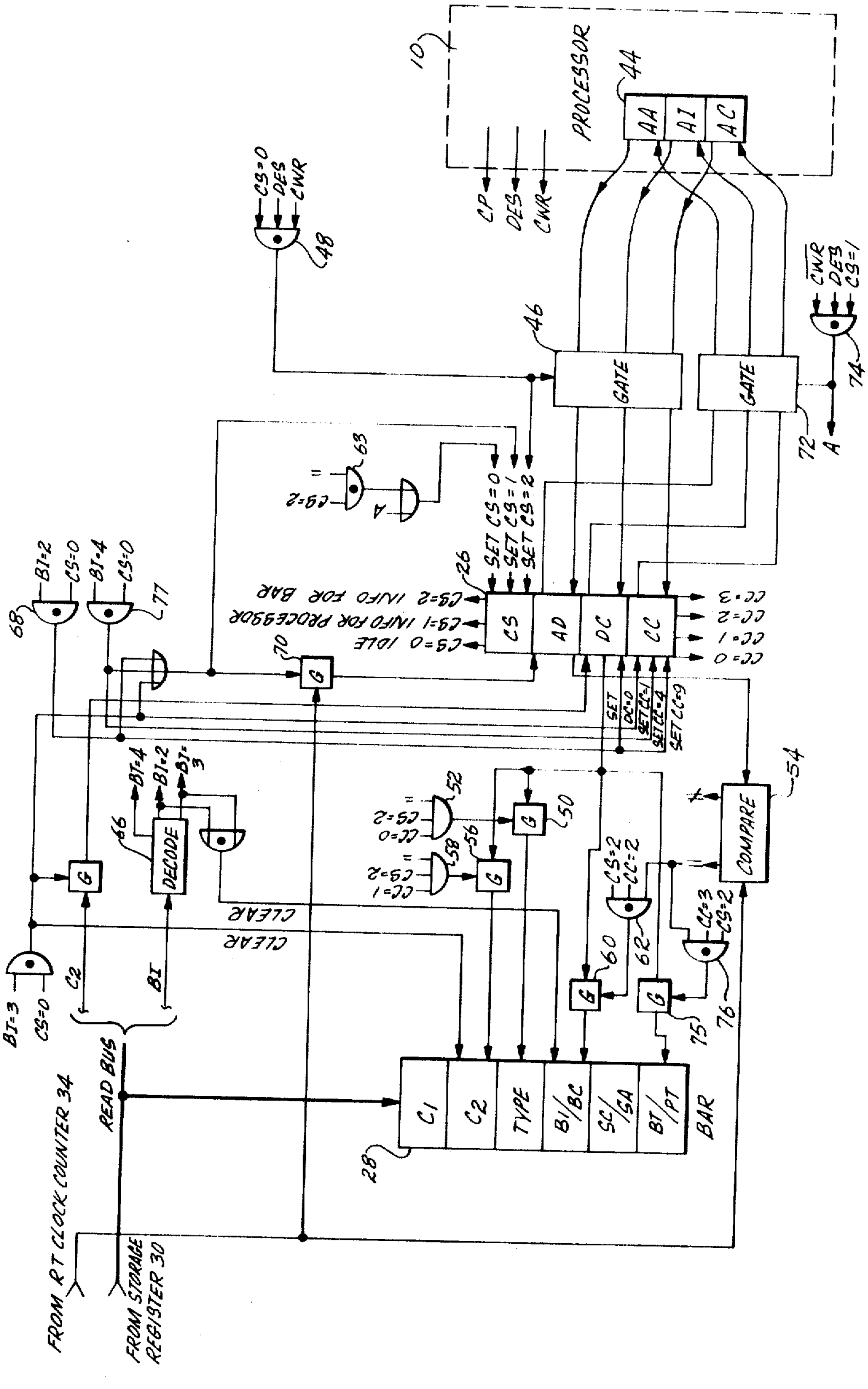
FIG. 4 is a block diagram of the interface circuitry between the processor and the control unit.

Referring to FIG. 4, the operation of the CIR register 26 is shown in detail. The processor 10, which may be of any standard general purpose digital processor, includes an Input/Output register 44, having three fields, designated AA, AI, and AC. On output these three fields are coupled through gate 46 to the AD, DC, and CC fields, respectively, of the CIR register 26. When the processor 10 is ready to transfer information into the control unit 12, it provides a Write signal on a control line CWR. It also designates, by a control line DES, a particular adapter control unit, where the processor is arranged to communicate with a number of such adapter control units. A logical AND circuit senses when the CWR line and the DES line from the processor go true and also senses that the CIR register is in the idle state, as indicated by the CS=0 line from the CS field of the register. The output from the AND circuit 48 activates the gate 46 to load the CIR register from the processor and at the same time to set the CS field to the CS=2 state, signaling that the CIR register is loaded with information for the BAR register 28.

The CC field of the CIR register 26 during a Write operation may specify a number of different operations. For example, a CC=0 condition represents an Initialization operation in which the DC field specifies the type of equipment on a particular communication line identified by the AD field. The Initialization operation normally would only be used when the equipment is started up or at any subsequent time when a particular communication channel is changed to a different type of communication equipment.

With the CS FIELD in the CS=2 state, indicating that there is information for the BAR register 28, and the CC field in the CC=0 state, indicating an Initialization operation, the DC field of the CIR register 26 is gated to the T field of the BAR register 28 by means of a gate 50. The gate 50 is controlled by the output of logical AND circuit 52 which senses the CC=0 state, the CS=2 state, and also senses the Equal (=) condition from a Compare Circuit 54. The latter compares the line designation in the AD field of the CIR register 26 with the line address specified by the Scan portion of the clock counter 34. Thus at the same time the switching circuit 32 is loading the BAR register 28 with the particular one of the control words in the storage register 30, the T field for that control word is set or modified by the DC field of the CIR register 26.

Similarly, if the CC field specifies a Write Data operation, indicated by the CC=1 state, a data character stored in the DC field of the CIR register 26 is transferred by a gate 56 to the $C_2$ field of the BAR register 28. The gate 56 is controlled by the output of an AND circuit 58 which senses the CC=1 state, the CS=2 state, and the equal state of the Compare circuit 54.

A third control operation, designated by the CC=2 state, provides for transfer of the contents of the DC field through a gate 60 to the BI/BC field of the BAR register 28. The control information loaded into the BI/BC field of the BAR register 28 may provide for a number of control functions for the particular communication line. For example, it may specify an Out-of-Service command (BC=0). It may specify a Look-for-Ring Indication command (BC=1). It may provide for an Initiate Transmit command (BC=5), or Initiate Receive command (BC=3). Thus the processor can programmatically initiate any of these modes of operation of the adapter control unit 12 by loading the appropriate designation in the BI/BC field of the BAR register 28. The gate 60 is controlled by the output of an AND circuit 62 which senses the CC=2 state, the SC=2 state, and the equal state from the compare circuit 54. At the end of the SC=2 state, the CS field is returned to the CS=0 or idle state by the output of an AND circuit 63.

It will be appreciated that all the above gating functions are synchronized with the system clock pulses CP so that the transfer takes place during one clock time, and the transfer from the CIR register 26 to the BAR register 28 takes place in the next clock time.

When the adapter control unit wants to communicate with the processor, it signals an interrupt condition by the BI/BC field of the control word. As the control word is read out from the storage register 30 of the BAR register 28 over the READ bus, the BI portion of the field is applied to a decoder 66 at the same time it is being transferred into the BAR register 28. If the adapter control unit is ready to transmit a character over a particular communication line, the BI portion of the control word provides a BI=2 state at the output of the decoder 66. If, on the other hand, the adapter control has received a complete character from a remote station which it wants to transfer to the processor 10, the control word provides a BI=3 condition at the output of the decoder 66. Other interrupt conditions may also be sent to the processor 10 in this manner.

In either the BI=2 or the BI=3 interrupt conditions are present on the READ bus, the $C_2$ field and the BI field in the BAR register 28 are cleared. An AND circuit 68 senses the BI=2 state from the decoder 66 and the CS=0 condition of the CS field in set CIR register 26. The output of the AND circuit 68 sets the DC field to DC=0 and sets the CC field to CC=9, for example. The CC=9 condition, when loaded into the processor 10, signals that the adapter control unit needs a character to transmit over the particular communication line. At the same time, the output of the AND circuit 68 is applied to a gate 70 which loads the AD field with the line address information derived from the SCAN output of the clock counter 34. Also, the CS field is set to the CS=1 state, signaling that the CIR register 26 is now loaded with information for the processor 10.

With CS=1 a gate 72 couples the AD, DC and CC fields, respectively, of the CIR register 26 to the AA, AI, and AC fields of the register 44 in the processor 10. An AND circuit 74 senses when the processor is ready to receive data by responding to the DES signal from the processor 10, the $\overline{CWR}$ condition from the processor 10, and the CS=1 state of the CS field in the CIR register 26. The output of the AND circuit 88 also resets the CS field to the idle state.

As each control word is placed in the BAR register 28 from the storage register 30, whether modified by the word in the CIR register 26 or not, it controls the operation of the adapter control unit in connection with the corresponding one of the lie adapters. Timing is such that another control word is brought into the BAR register 28 with each clock pulse. At the same time, the condition of output lines from the associated line adapter is stored in the Input register 40. The logic circuit 36, in response to the levels established by the Input register 40, the BAR register 28, and the Real time clock counter 34, establishes a control word on the Write bus for storage back into the storage register 30 in response to the next clock pulse. In only the relatively few instances in which there has been a change in the status of the Input register 40 or the clock counter has advanced to a predetermined count condition will the control word placed on the Write bus be modified from the control word in the BAR register 28. Otherwise the control word is restored in the storage register unmodified. The logic circuit 36 also sets the Output register 42. The next clock pulse then causes the status of the Output register 42 to be transferred and stored in the same line adapted for servicing the associated data set and communication line. There is thus a continuous scanning of the output of each of the line adapters and each of the associated control words in the storage register 30 by the logic circuit 36. This scanning takes place at a much higher rate than the bit rate on any of the transmission lines.

To better understand the operation of the adapter control unit 12, the logic circuitry necessary to perform certain control functions for asynchronous type data sets will be described. The line adapter circuitry for use with most conventional asynchronous type data sets is shown in FIGS. 5. Three input signals to the standard data set are the Data Terminal Ready signal CD, the Request-To-Send signal CA, and the Transmitted Data signal BA. These signals are received from the Output register 42 through the gating matrix 38 and are stored, respectively, in three flip-flops in the adapter, indicated at 80, 82, and 84. The output levels to the data set are derived from the flip-flops through suitable driver amplifiers 86, 88, and 90, respectively. The Request-To-Send signal and the Data Terminal Ready signal from the output of the flip-flops 80 and 82 are coupled back to the Input register 40 through the gating matrix 38. The other input signals derived from the data set and coupled to the Input register 40 are the Received Data signal BB, the Clear-To-Send signal CB, and the Data Carrier Detector Signal CF. All of these signals are applied to the Input register 40 through the gating matrix 38 from suitable driver amplifiers indicated at 92, 94, 96, 98 and 100, respectively.

Figure 6:
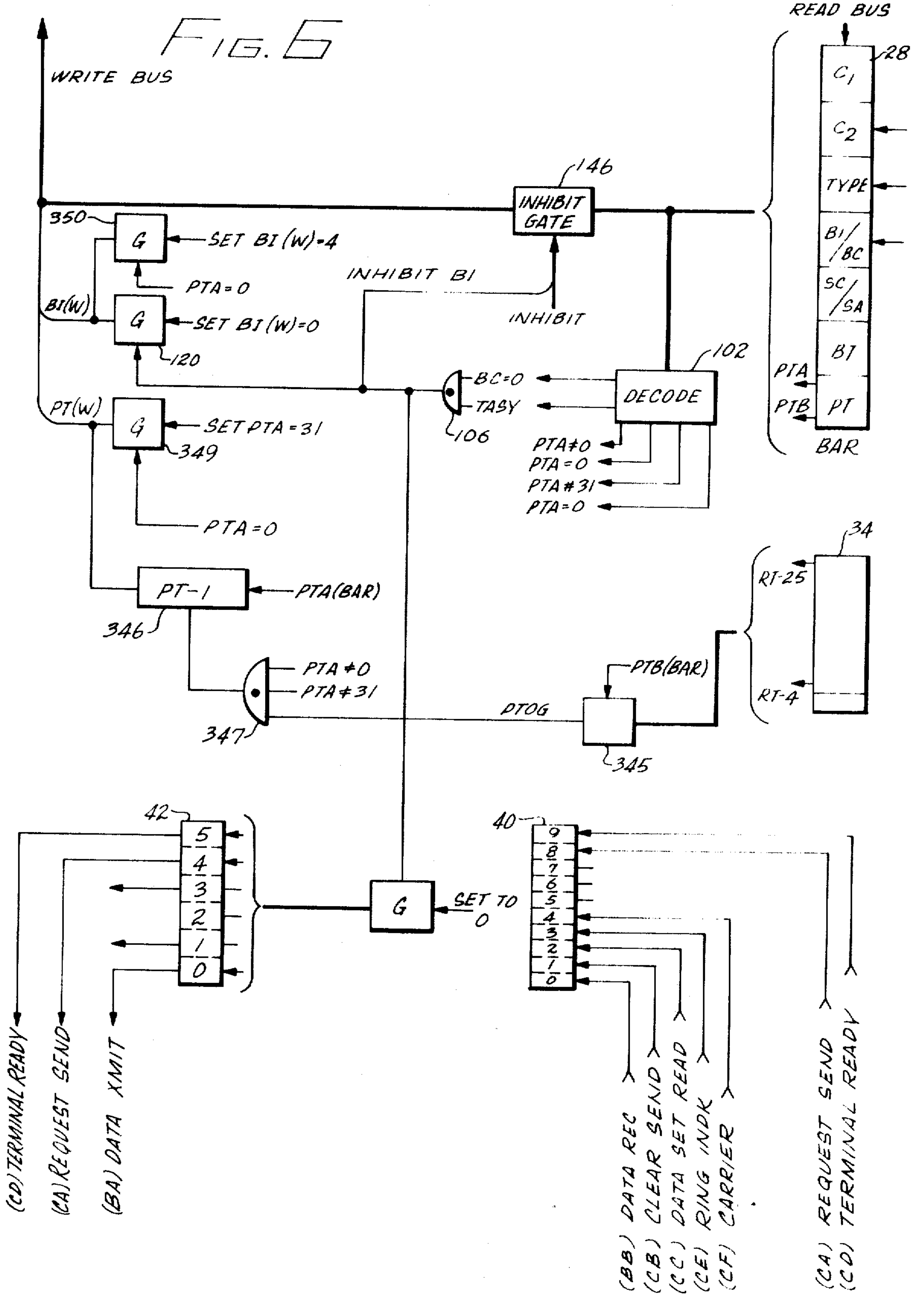
FIG. 6 is a schematic diagram of the logic circuit for an Out-of-Service control function.

Referring to FIG. 6 there is shown the logic circuit for carrying out the Out-of-Serivce command for an asynchronous type data set. As each control word is loaded in the BAR register 28, it is applied to a decoder 102. All asynchronous type communication systems, in response to the decoded T field, activate an output line, designated TASY, indicating that an asynchronous type adapter is being serviced. At the same time, the BC field applied to the decoder 102 for the Out-of-Service command, activates the BC=0 output line. An AND circuit 106 senses the TASY condition and the BC=0 condition. This sets the three output lines from the Output register 42 to 0 or Off. The output of the AND circuit 106 is also applied to a gate 120 which provides BI(W) portion of the Write bus to 0. This inhibits any interrupts being flagged to the processor by the adapter control for the associated line adapter. All other fields of the control word are gated to the Write bus directly from the BAR register 28 by an inhibit gate circuit 146. The output of the AND circuit 106, in addition to being applied to the gate 120, is applied to the inhibit gate circuit 146 to inhibit the BI field in the BAR register 28 from being gated to the BI (W) field of the Write bus. Thereafter, in the drawings, the inhibit lines will not be shown, but it will be understood that any of the BAR register fields are always inhibited when the corresponding field of the Write bus is being modified by the logic circuit 36.

Figure 7:
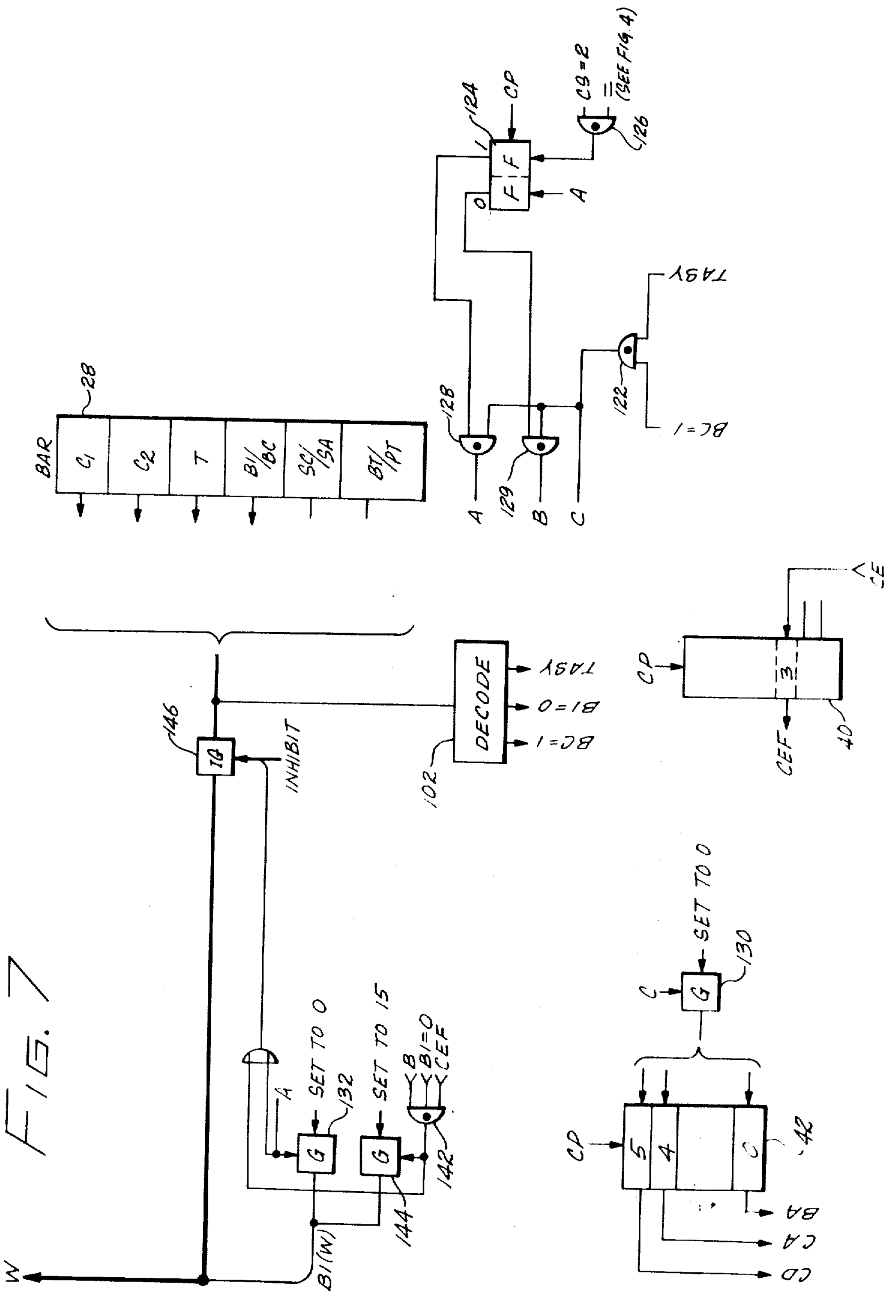
FIG. 7 is a schematic diagram of the logic circuit for Look-for-a-Ring-Indicator control function.

If the processor wants to service a Rind Indication from a remote terminal, it sets the BC field in the BAR register 28 to BC=1. Operation of this condition is shown in FIG. 7. The decoder 102 signals the TASY condition and the BC=1 condition. These two states are applied to an AND circuit 122. The output of the AND circuit 122, indicated at C, signals the command to look for the RING Indicator CE from the line adapter. A control flip-flop 124 is turned on initially by the output of an AND circuit 126 which senses that the CS field in the CIR register 26 is in the CS=2 state and that the Compare circuit 54 senses an equal condition. Thus the flip-flop 124 is turned on whenever the BAR register 28 receives information from the CIR register 26. An AND circuit 128 senses that the flip-flop 124 is on and that the output of the AND circuit 122 is true, providing an output indicated at A. Another AND circuit 129 provides an output, indicated at B, when the flip-flop 124 is reset by the output of the AND circuit 128.

The output C of the AND circuit 122 is applied to a gate 130, the output of which sets the Output register 42 to all zeros, turning off the output lines to the line adapter. The output A from the AND circuit 128 is applied to a gate 132, the output of which sets the BI field of the Write bus to 0. All but the BI field of the BAR register 28 are transferred directly to the Write bus during this operation by the inhibit gate circuit 146. At the same time the control flip-flop 124 is turned off with the next clock pulse by the output of the AND circuit 128.

On subsequent scans of the same control word and associated line adapter, when the control word for the particular line adapter is returned to the BAR register 28, and the output B of the AND circuit 129 is true, the decoder 102 senses that the BI field of the control field is set to BI=0. If a Ring Indication is now present, the CEF line to the Input register 40 is turned on by the CE line of the associated adapter. An AND circuit 142 senses that BI=0 and that CEF is present from the Input register 40. The output of the AND circuit 142 operates a gate 144 which gates a constant 15 to the BI lines of the Write bus. Except for the BI lines of the Write bus, all other lines are connected to the BAR register 28 by the inhibit gate circuit 146. However, the presence of an output from the gates 132 and 144 provide an inhibit signal to the inhibit gate circuit 146 which inhibits gating the contents of the BI portion of the control field in the BAR register 28 to the Write bus. By changing the BI portion of the control word to 15, an interrupt condition is flagged to the processor though the CIR register 26, signaling the processor that there is a Ring Indication from a particular remote station.

Figure 8:
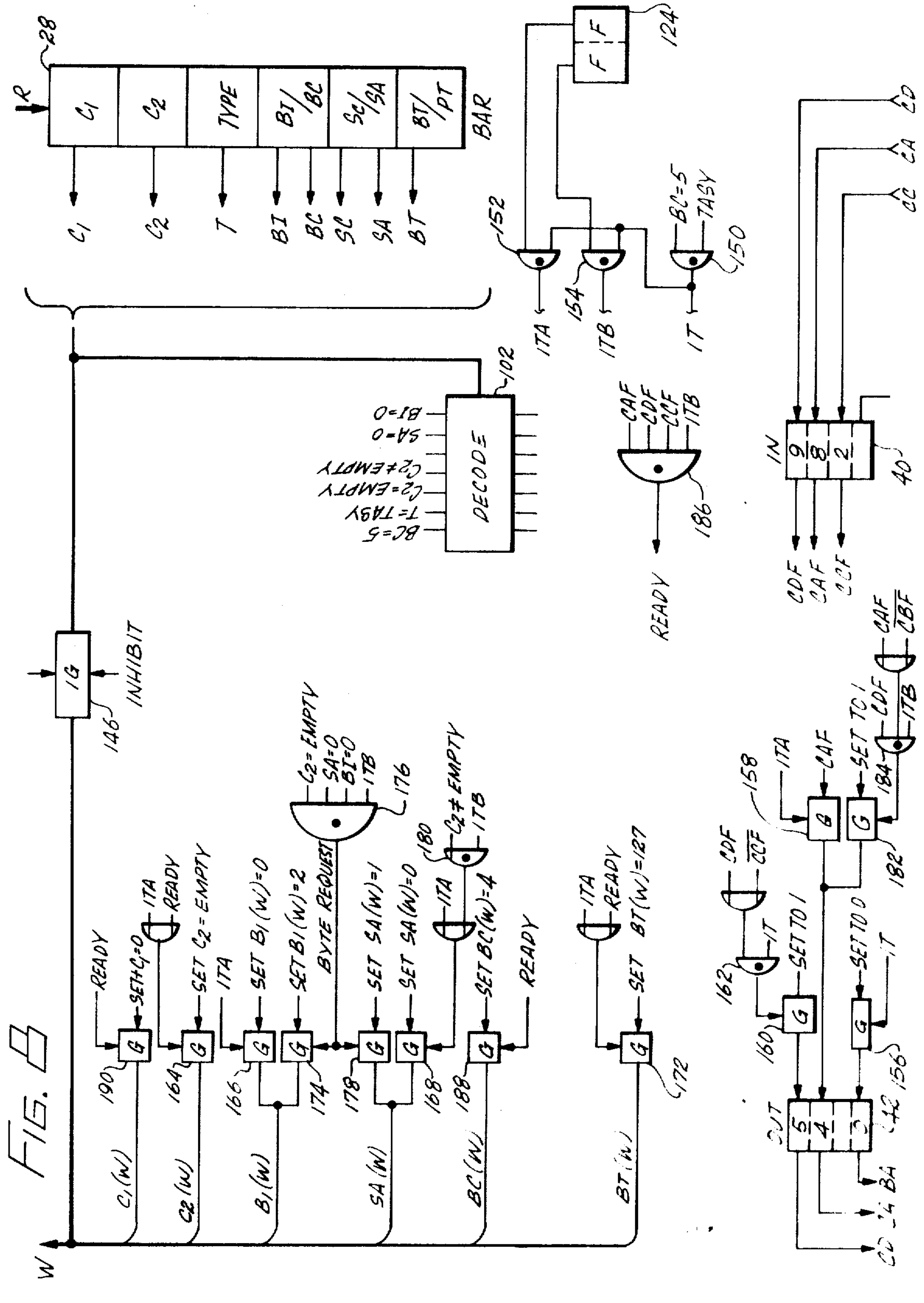
FIG. 8 is a schematic block diagram of the logic circuit for the Initiate Transmit function.

When the processor wants to transmit information to a particular remote station, it initiates a CWR operation, in the manner described above in connection with FIG. 4, changing the BC field of the associated control word in the BAR register 28 to a BC=5 state. The BC=5 state provides an Initiate Transmit mode of operation as shown in FIG. 8. An AND circuit 150 senses the BC=5 state and TASY, the output of the AND circuit, indicated as IT, signaling the Initiate Transmit mode. AND circuits 152 and 154 coupled to the output of the control flip-flop 124 and the output of the AND circuit 150 provide the two control outputs ITA AND ITB. As described above, the ITA output is true the first time the control word in the BAR register 28 is modified by the processor to the BC=5 state.

During ITA, a house-cleaning operation takes place in which the BA line from the Output register 42 is set to 0 by a gate 156. Also the CA line from the Output register 42 is set to the level of the CAF line from the Input register 40 by a gate 158. The CA line establishes a Request-To-Send condition to the line adapter and on to the data set. If the data set is already in a Transmit condition, the CAF level from the Input register 40 will be true. Also the CD line from the Output register 42 is set to 1 by a gate 160 in response to the output of an AND circuit 162 which senses that the IT mode is present and that the CDF line from the Input register 40 is true, or that the CCF line from the Input register 40 is false. The CDG line establishes that the data terminal Ready condition is already present in the line adapter. The $\overline{CCF}$ condition indicates that the data set is signaling that it is not ready.

During the ITA condition from the output of the AND circuit 152, the Write bus levels are modified to set the fields in the control word to the proper state for initiating a Transmit mode of operation. The $C_2$ field is cleared and placed in an Empty state by the output of a gate 164. The BI field is set to 0 by the output of a gate 166. The SA field is set to 0 by the output of a gate 168. Also the CT field is set to 3 by the output of a gate 170 while the BT field is set to the maximum value of 127 by the output of a gate 172. On the next scan of the adapter and associated control word, the modified control word established on the Write bus is read back into the BAR register 28 from the storage register 30.

With the modified control word again back in the BAR register 28 and the control flip-flop 124 reset, the ITB condition at the output of the AND circuit 154 is established. During this phase of the operation, the BI field of the control word is set to 2 by the output of a gate 174. As described above in connection with FIG. 4, BI=2 provides an interrupt condition for signaling the processor to provide a character of information in the $C_2$ field. This interrupt condition, referred to as a Byte Request, is set by the output of an AND circuit 176 applied to the gate 174. The ANd circuit senses, from the output of the decoder 102, that the $C_2$ field of the BAR register 28 is empty, that the SA field is equal to 0, and that the BI field is equal to 0. At the same time, the output of the AND circuit 176 operates a gate 178 to set the SA field to 1 on the Write bus. If $C_2$ is not empty during the ITB operation, as sensed by an AND circuit 180, the SA field is set to 0 by the gate 168.

At the same time the CA line from the Output register 42 must be turned on to provide a Request-to-Send signal to the data set. This is accomplished by a gate 182 which is controlled by the output of an AND circuit 184. The AND circuit senses that the CDF level from the Input register 40 is true and that either the CAF level from the Input register 40 is true or $\overline{CDF}$ is true.

Once the CA level from the Output register 42 is turned on, signaling a Request-To-Send to the data set, the output of an AND circuit 186 goes true when CDF, CAF and CCF from the Input register 40 are all ture, signaling that the data set is ready to transmit data. The output of the AND circuit 186 modifies the control word on the Write bus to set the BC field to 4. This establishes the Transmit mode described below in connection with FIG. 9. The BC=4 state is set by the output of a gate 188 to which the READY output of the AND circuit 186 is applied. In addition the CT field is set to 3 by the output of the gate 170 and the BT field is set to 127 by the output of gate 172. The $C_2$ field is cleared and set to empty by the output of the gate 164. The $C_1$ field is cleared by the output of a gate 190. With the BC field now set to 4, the adapter control unit enters the Transmit mode of operation for the corresponding line adapter during subsequent scans.

Figure 9:
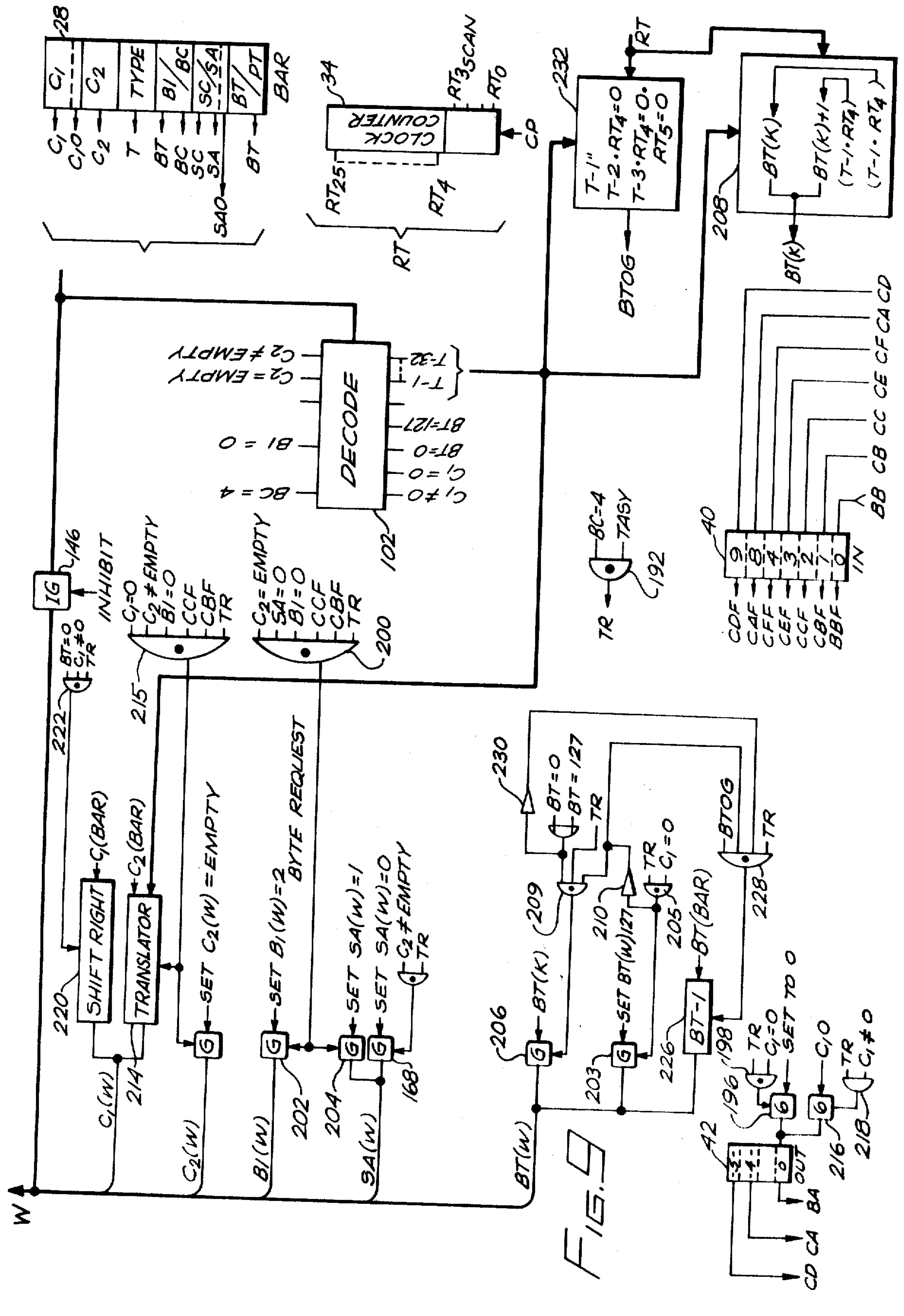
FIG. 9 is a schematic block diagram of the logic circuit for the Transmit function.

Referring to FIG. 9, when the same control word is again loaded in the BAR register 28 from the storage register 30 during the continuous scanning operation, the BC=4 condition is decoded by the decoder 102. The control word remains in the BC=4 condition of the BC field until modified by the processor, such as when a complete message has been sent from the processor, to the particular remote station. The transmit mode is established by the output of an AND circuit 192 which, in response to the output of the decoder 102, senses the BC=4 condition is present in the BC field of the BAR register 28 and that the T field designates an asynchronous type data set (TASY) on the line. The output of the AND circuit 192 is indicated as TR.

During the Transmit mode, characters or message bytes are loaded into the $C_2$ field of the control word by the processor in response to a Byte Request Interrupt (BI=2). Each character is then transferred from the $C_2$ field to the $C_1$ field; during the transfer the character goes through a translator circuit which modifies the character by adding start and stop bits, a parity bit, or other modifications necessary to arrange the character in proper format for transmission by the data set. Each bit of the translated character is then transferred from the lowest order bit position of the $C_1$ field serially to the lower order bit position of the Output register 42 for controlling the data output line BA to the line adapter and the data set.

As pointed out above, there are a number of different asynchronous types of data sets which differ as to the number of bits per character and the rate, referred to as the baud rate, at which bits are transmitted over the communication line. For example, one type may have a character size of 6 bits, including a Start bit and a Stop bit, another type 9 bits, another type 10 bits, another type 11 bits, etc. A number of baud rates are used, from the slow rate of 45.5 bits per second to a high rate of 96,000 bits per second. Some types require two Stop bits at the end of each character, and some types include, in addition, a parity bit. As described hereinafter, the baud rate for transmission of data is controlled by a combination of the BT field and the T field of the control word. The BT field of the control word is set in response to the T field at the beginning of the Transmission of the character from the $C_1$ field.

With the output TR from the AND circuit 192 being true, signaling a Transmit mode of operation, the BA line from the Output register 42 is initially set to 0 by the output of a gate 196 which is controlled by an AND circuit 198 which in turn senses the TR condition and the fact that the $C_1$ field is equal to 0. At this time the CAF line and the CDF line from the Output register 42 are both on. If there is no character present in the $C_2$ field, a Byte Request Interrupt is initiated by setting the BI field to 2. A Byte Request is signaled by the output of an ANd circuit 200 which senses that $C_2$ = Empty, the SA field is 0, the BI field is 0, and that CCF and CBF lines from the Input register 40 are both on. The output of the AND circuit 200 controls a gate 202 which sets the BI field of the Write bus to BI=2. At the same time a gate 204 sets the SA field to 1, signaling that a Byte Request has been made. Also, the BT field of the Write bus is set to an initial value BT by a gate 206. The initial value or constant to which the BT field is set is a function of the type of data set being serviced and is derived from a constant generating network indicated generally at 208. The gate 206 is controlled by the output of an AND circuit 209 which senses that the BT field in the BAR register 28 is either BT=0 or BT=127. The AND circuit 209 also senses the TR line, indicating that the Transmit mode is being executed. It also senses by means of an inverter 210, that the output of an AND circuit 205 is not setting the BT field to 127 through a gate 203.

Once the $C_2$ field is loaded by the processor in response to the Byte Request interrupt, the decoder 102 establishes the $C_2 \neq$ Empty condition. The $C_2$ field is then modified, as indicated above, to insert the necessary Start and Stop bits, as well as a parity bit where required, and loaded into the $C_1$ field. This is accomplished by a translator network 214 to which the $C_2$ field from the BAR register 28 is applied together with the decoded T field from the output of the decoder 102. Depending upon which type of data set is designated by the T field, the translator 214 modifies the bit pattern of the character applied to the $C_1$ field of the Write bus in response to the character present in the $C_2$ field of the BAR register 28. For example, a Stop bit is usually inserted by the translator in the lowest order bit position of the $C_1$ field, the character present in the $C_2$ field of the BAR register is inserted in the corresponding number of next higher order bits, a parity bit may be inserted in the next higher order bit, and a Stop bit is inserted in the highest order bit position to the $C_1$ filed. The translator 214 is activated by the output of an AND circuit 215 which senses the Transmit mode, that $C_1$=0, that $C_2 \neq$ Empty, that BI=1, and that CCF and CBF from the Input register 40 are true. Once the $C_1$ field is loaded in the Bar register 28, the character is read out of the $C_1$ field serially from the lowest order bit position by doing a shift operation on the $C_1$ field after each bit is read out to the Output register 42. The lowest order bit position of the $C_1$ field in the BAR register 28, designated $C_1$0, is applied to the BA line position of 1Output register 42 through a gate 216, the gate being controlled by the output of an AND circuit 218. The AND circuit 218 senses that the $C_1$ field is not 0 and that the TR line is true. Thus, once the $c_1$ field in the BAR register 28 is loaded by the control word, the lower order bit position, which is the Start bit, is applied to the Transmit data line BA going to the associated line adapter. This condition remains for a period of time required by the baud rate of the particular data set identified by the T field.

As pointed out above, the next bit is applied to the output line BA by shifting the character in the $C_1$ field to bring the next lowest order bit in the $C_1$0 bit position. This is accomplished by applying the $C_1$ field from the BAR register 28 to a Shift right network 220, which in effect applies each of the bits of the $C_1$ field in the BAR register to the next lowest bit position of the $C_1$ field in the Write bus. Thus, the next time the control word is loaded into the BAR register 28 from the storage register 30, the next lowest order bit will appear in the $C_1$0 position. The shift Right operation takes place in response to the output of an AND circuit 222 which senses that the BT field of the BAR register 28 is in the BT=0 condition, as indicated at the output of the decoder 102 and also that the $C_1$ field is $\neq$ 0. Each time the BT field is reduced to BT=0 another bit is transmitted to the line adapter.

One of the unique aspects of the present invention is the manner in which the BT field is controlled so that it is set to the BT=0 condition at the proper time as required by the baud rate of the particular type of data set being serviced. This time interval is determined by the initial value BT (K) to which the BT field is set by the output of the gate 206 and by the rate at which the BT field is decremented back to the BT=0 state. Decrementing of the BT field can take place at any integral multiple of the time required for successive scans of a particular control word in the storage register 30. Decrementing of the BT field is done by a subtractor circuit 226 which receives the contents of the BT field in the BAR register 28 and, when activated, subtracts 1 from the BT field, applying the output of the BT field of the Write bus. The subtractor 226 is activated in response to the output of an AND circuit 228. The AND circuit senses when the TR condition is true, senses when the BT field is not being set to 127, or being set to 0, as indicated by the output of the inverter 210 and the output of an inverter 230, respectively. The AND circuit also senses when a BT toggle (BTOG) is true. The BTOG signal is generated by a control logic circuit 232 in response to the decoded T field from the decoder 102 and the count condition of the clock counter 34. The clock manner 34 operates as a binary divider. The four lowest order stages of the counter, designated $RT_0$ through $RT_3$, control the scanning of the 16 line adapters and the storage register 30. The higher order stages, designated $RT_4$ through $RT_{25}$, are applied to the logic network 232. The $RT_4$ output, for example, provides a square wave output which changes level with each complete scan of the adapter lines. The next higher order output provides a square wave having twice the period of the immediately lower order stage. BTOG goes true at the output of the network 232 whenever the T field designates a particular type of data set and the counter 34 is in a particular count condition. For example, if BTOG is required to be true on every scan cycle, for servicing a particular type of data set, the T field output line from the decoder 102 is connected directly to the BTOG output. As for example the T-1 line might be connected directly to the BTOG output in the logic network 232. By way of further example, is if BTOG needed every other scan of the line adapters for a type field T-2, then the network 232 makes BTOG true only when T-2 is true and $RT_4$=0 is true. If a type field T-3 requires that BTOG be true on every fourth scan, for example, then the network 232 makes BTOG true when T-3 is true $RT_4$=0 is true and $RT_5$=0 is true.

In this manner, for any specified type field, the BT field can be decremented at any predetermined integral multiple of the scan repetition rate of each line adapter. By controlling the initial setting of the BT field by the BT (K) constant from the circuit 208 and by controlling the rate at which the BT field is decremented down to 0, the rate at which the $C_1$ field is shifted and therefore the time that the next lowest order bit is applied to the data output line BA may be predetermined for each different type of line adapter being serviced. Merely by loading the T field of the control word with the designation of the particular type of line adapter and data set, the proper baud rate for transmitting and receiving data by that data set is established.

Although the combination of the selection of the initial setting of the BT field and the selection of the rate at which the BT field is counted down to 0 provides a large range of possible baud rates, the selection is not infinite. The selected baud rates, therefore may be still slightly different than the required baud rate of the data sets. A higher percentage error per bit may be tolerated by the data set than the permissible error accumulated over a full character. The cumulative error per character is controlled by changing the value of the constant BT (K) by 1 for one or more bit intervals during the transmission of the character. To this end, the output $RT_4$ through $RT_{25}$ of the clock counter 34 is applied to the constant generating network 208. The network 208 is arranged such that a predetermined time intervals the value of the constant generated in response to a particular applied type field from the decoder 102 is increased by 1. This increases the bit time for the corresponding bit in the character thereby adjusting slightly the accumulated time required to transmit a full character.

Receiving of data is similarly controlled by the adapter. control unit. To go into an Initiate Receive mode, the control word for a particular communication line has the BC field set to 3 programmatically by the processor. During the BC=3 state, called the Initiate Receive mode, the Request-To-Send (CA) line is turned off, the $C_2$ and $C_1$ fields are cleared, the BC field is set to 2 and the remaining control fields are set to initial values.

The BC=2 state, called the Receive mode, controls the timing and strobing of the formation received from a remote terminal, loading the character into the $C_1$ field, then translating the received character into the $C_2$ field and flagging the processor to indicate that data is present. The processor then causes the character in the $C_2$ field transferred through the CIR register in the $C_2$ field to be transferred through the CIR register to the processor in the manner described above in connection with FIG. 4. Again the T field is used in connection with the networks 208 and 232 to control the time intervals in which the bits stored in the Input register 40 over the Received Data line BB is strobed into the lowest order bit position of the $C_1$ field of the control word. As in the transmission operation described above, again each communication line and associated line adapter is scanned in synchronism with the scanning of the control words in the storage register 30. Thus all the lines are continuously serviced on a time-sharing basis without interruption of the scanning operation.

Figure 10:
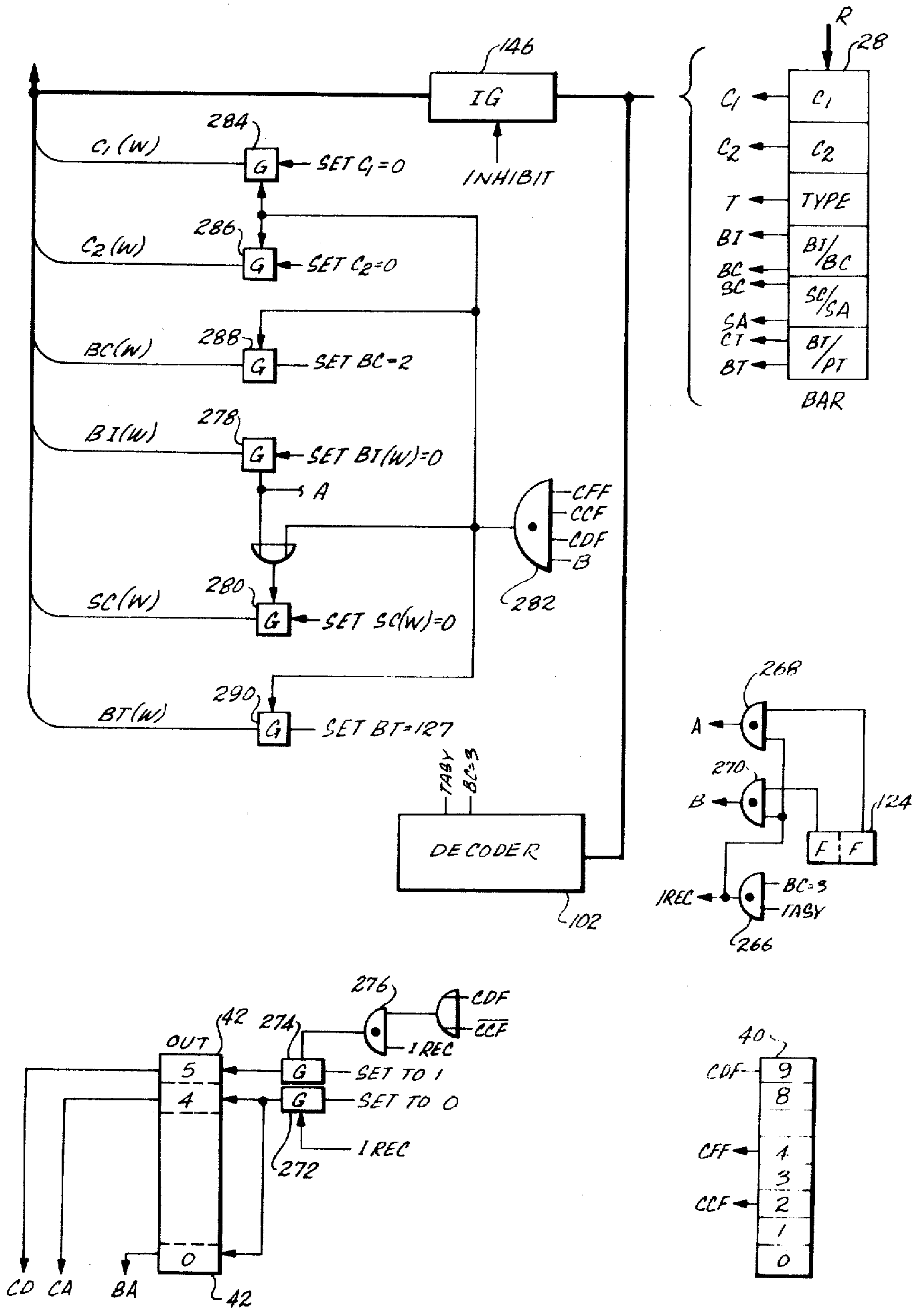
FIG. 10 is a schematic block diagram of the logic circuit for the Initiate Receive function.

The Initiate Receive mode in which the BC field is set to 3, is shown in FIG. 10. Assuming the Initiate Receive mode has been entered programmatically, the control flip-flop 124 will be turned on. An AND circuit 266 senses an asynchronous type field TASY and a BC=3 condition from the decoder 102. The output of the AND circuit 266 signals an Initiate Receive condition, labeled IREC. An AND circuit 268 provides an output A when the control flip-flop 124 is initially on, while an AND circuit 270 provides an output B when the control flip-flop is reset to 0 as is the Data Transmit line BA. This is accomplished by the output of a gate 272. At the same time, the Data Terminal Ready line CD is turned on by the output of a gate 274 in response to the output of an AND circuit 276, which senses the Initiate Receive mode IREC and that either the CDG line from the Input Register 40 is true, or the CCF line from the Input register 40 is false.

Initially the BI field is set to 0 and the SC field is set to 0 in response to the output A of the AND circuit 268 applied to gates 278 AND 280. On subsequent scans of the control word, with the flip-flop 124 reset so that the output B of the AND circuit 270 is true, a determination is made as to when the CDF, CCF, and CFF lines from the Input register 40 are all true. This is sensed by an AND circuit 282, the output of which sets the $C_1$ field to 0 through gate 284, sets the $C_2$ field to 0 through a gate 286, sets the BC field to BC=2 through a gate 288, sets the SC field to 0 and sets the BT field to the maximum count 127 by means of a gate 290. With the BC field now set to 2 and the SC field now set to 0, the adapter control unit goes into the Receive mode (BC=2) for servicing the particular communication line associated with that control word.

Figure 11:
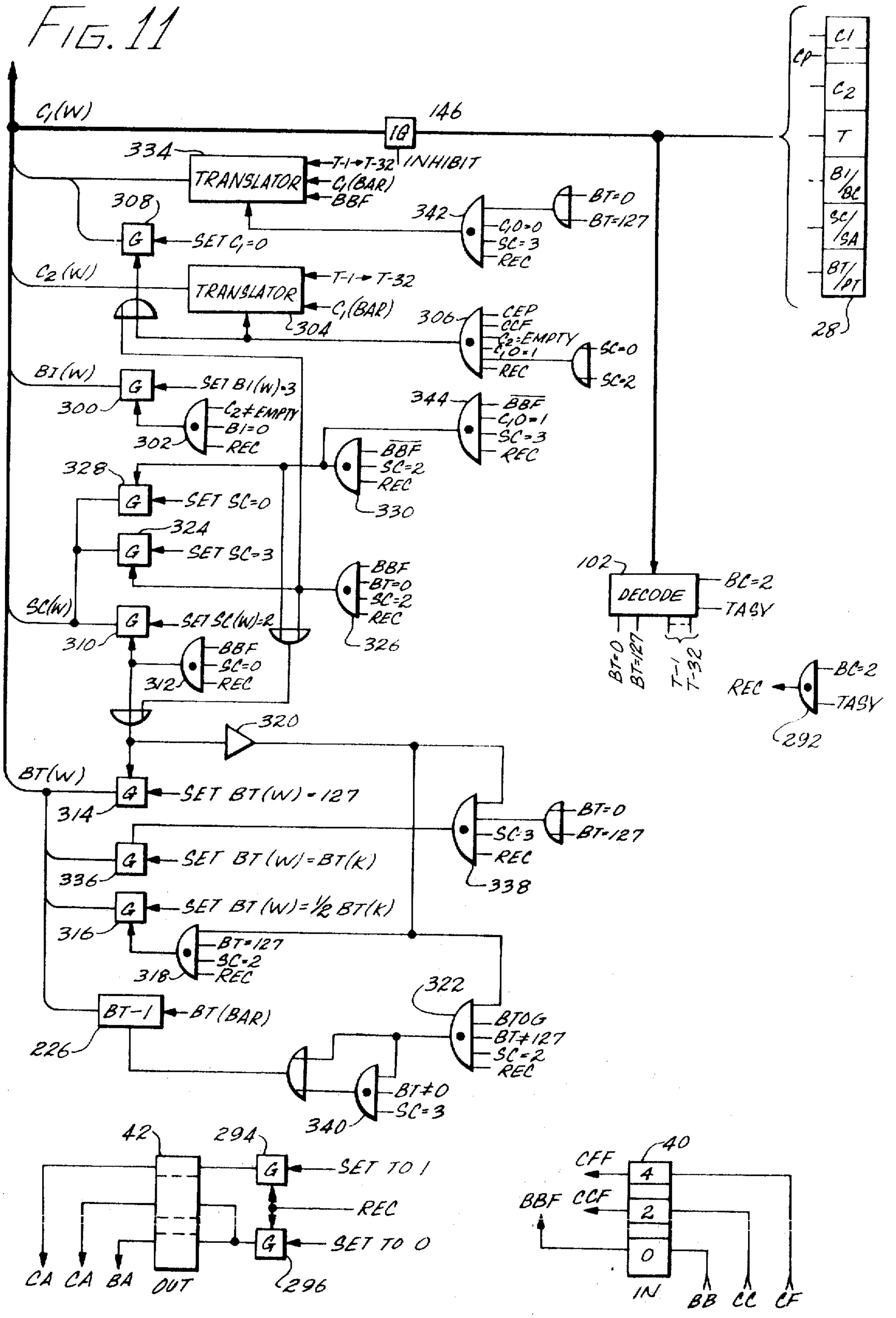
FIG. 11 is a schematic block diagram of the logic circuit for the Receive function.

Operation of the adapter cluster during the Receive mode is shown in detail in FIG. 11. The Receive mode is established by the output of an AND circuit 292 which senses the BC=2 state and the asynchronous type field TASY from the decoder 102. The output of the AND circuit 292, labeled REC, turns on the DATA Terminal Ready line CD from the output register 42 by means of a gate 294. It also sets the Request-To-Send line CA and the Data Transmit line BA off by means of a gate 296. Whenever the $C_2$ field is loaded with a received character for the processor, a Data Present interrupt is sent to the processor in the manner described in connection with FIG. 4. To this end, a gate 300 sets the BI field to 3 in response to the output of an AND circuit 302 which senses the Receive mode REC is present, that existing existing BI field is 0 and that the $C_2$ field is not empty.

The Receive mode has several operational stages controlled by the SC field. With SC=0, the adapter control unit looks for the Received Data line BBF to go true. This occurs when the Start bit is received by the data set from the remote station. When BBF goes true, the adapter control unit goes into the SC=2 stage where it tests to see whether BBF stays on for s sufficiently long time to indicate that it is nor merely noise on the line or some other transient condition which made BBF go true. If BBF goes off it returns to the SC - 0 stage. If it does not go off, it goes to the SC=3 stage in which it strobes the received character into the $C_1$ field and then returns to the SC=0 stage, loads the $C_2$ field from the $C_1$ field and flags the processor that a character is present.

Referring again to FIG. 11, with the SC field at 0, as indicated by the decoder 102, if a received character has already been assembled in the $C_1$ field, it is transferred to the $C_2$ field. This is accomplished by a translator circuit 304 which receives the contents of the $C_1$ field in the BAR register 28 and also the type indication from the decoder 102. The translator, depending upon the type of data set from which the character was received, may modify the character before it is placed in the $C_2$ field from which it is transferred to the processor. For example, the translator may reverse the order of the bits in the character to place the most significant bit in the proper position. The translator also strips off the Start and Stop bits and may change the relative position of the parity bit.

The translator 304 is activated to transfer the character to the $C_2$ field of the Write bus in response to the output of an AND circuit 306. The AND circuit 306 senses that the Receive mode REC is present, that the SC field is equal either 0 or 2, since the transfer can take place in either of these stages of operation, whether the $C_2$ field is empty, and whether CFF AND CCF lines are true, indicating that the data carrier is present from the data set and that the data set is turned on. The AND circuit 306 senses when the $C_1$ field is loaded by sensing when the lowest order bit $C_10$ goes true. As a character is received into the $C_1$ field bit by bit, in the manner hereinafter described, the Start bit is continuously shifted to a lower order bit position in the $C_1$ field. When it finally is shifted to the lowest order bit position, the entire character has been loaded into the $C_1$ field. The Start bit sets the $C_10$ line true, signaling that the $C_1$ field has been loaded. At the same time, the output of the AND circuit 306 clears the $C_1$ field by means of a gate 308.

With the SC=0 state present, when BBF goes true, indicating the Start bit of a new character has been received on the line BB from the data set, the SC field is set to 2 by a gate 310. The gate 310 is controlled by the output of an AND circuit 312 which senses that REC is present, SC=0 is present, and BBF is true. The output of the AND circuit 312 also sets the BT field BT (W) =127 through a gate 314.

With the SC field set to 2, on subsequent scans of the control word into the BAR register 28, the BT field is set to provide a half bit timeout. The half bit timeout permits received data to be strobed approximately in the middle of the bit time during which an incoming bit is present on the Data Received line BB from the data set. This is accomplished by setting the bit field to half the value of the bit constant from the constant generator 208 for the particular type of data set identified by the T field of the control word. A gate 316 sets the BT field to one-half the bit timing constant from the constant generator 208 in response to the output of an AND circuit 318 which senses that REC is true, that SC=2, that the BT field in the BAR register 28 is at BT=127, and that the bit timing field is not being set to 127, as established by the output of an inverter 320 connected to the input to the gate 314. The BT field is subsequently counted down by the subtractor 226 by the output of an AND circuit 322 which senses the Receive mode REC, the SC=2 state that the BT ≠ 127, that the BT field is not being set to 127, and that the bit toggle BTOG signal from the logic network 232 is true. In this manner, the BT field is counted down to 0 in a period of time representing half the bit period for the particular type of data set identified by the T field of the control word.

If the BBF line is still true when the BT field is counted down to 0, this signals that a Start bit is truly present on the receive date line BB. As a result, the SC field is set to 3 by output of a gate 324, AND circuit 326 which senses that BT=0 is true, and BBF is true. At the same time, the BT field is again set to 127 by the gate 314 and the $C_1$ field is set to 0 by the gate 308. If, on the other hand, the BBF line has not remained true, indicating that only a transient condition was present, the SC field of the Write bus is set to 0 by a gate 328 in response to the output of an AND circuit 330, which senses that BBF is not true. The AND circuit 330 also activates the gate 314 to set the BT field back to 127.

Assuming that the Start bit was present, and the SC field is set to 3, during subsequent scans, the full character received serially on the line BB from the data set is strobed bit-by-bit into the $C_1$ field of the BAR register 28. This is accomplished by a translator network 334 to which the T field from the decoder 102 is applied together with the $C_1$ field in the BAR register 28 and the BBF line from the input register 40. Depending upon the type field, the translator sets the level on the BBF line on the highest order line of the $C_1$ field corresponding to the number of bit positions in a full character received from a remote station. Thus if the data set is of a type which transmits a Start bit, four data bits, and a Stop bit, the translator would transfer the level of the BBF line to the sixth lowest order line going into the $C_1$ field. All of the lines coming in from the $C_1$ field in the BAR register 28 are shifted to one lower order position at the output of the translator 334. Thus each time the translator 334 is activated, the bit on the incoming line BB from the data set is loaded into the $C_1$ field and all the prior bits of the character are shifted down one.

At the start of the SC=3 state, the BT field on the Write bus is set to the particular constant BT (K) established by the constant generator 208 in response to the type field through a gate 336, controlled by the output of an AND circuit 338. The AND circuit 338 senses that SC=3 and that BT=0 or 127 during the Receive mode REC. The BT field is subsequently counted down by means of the subtract circuit 226 in response to the output of an AND circuit 340 which senses that SC=3, that BT ≠ 0 and that the output of the AND circuit 322 is true. The translator 334 is activated to strobe in the next bit on the BB line in response to the output of an AND circuit 342, which senses SC=3 during the REC mode, senses the lowest order bit $C_1 0$ is 0, and that the BT field is either 0 or 127.

Once the full character is strobed into the $C_1$ field and $C_1 0$ goes true, the adapter control unit is returned to the SC=2 stage. This is accomplished by activating the gate 328 in response to the output of an AND circuit 344 which senses that $C_1 0$=1 line from the $C_1$ field in the BAR register 28 is true and that BBF is off. At the same time the BT field is reset to 127 by the gate 314. The control word is now set to control the adapter control unit to receive the next character and to load the $C_2$ field and send a Data Present interrupt to the processor, in the manner described above. The control word remains in the Receive mode until the BC field is again changed by the processor. This is accomplished when the processor recognizes a character signaling the end of a message, for example.

One of the advantages of the timing arrangement is that it provides a convenient way for the processor 10 to derive timeout intervals programmatically. By using the storage register 30, sixteen different timeout intervals may be in progress at the same time. This may be accomplished by means of a processor timing field PT in the BAR register 28. The PT field of each control word is loaded from the processor 10 in the manner shown in FIG. 4. The processor loads the address of one of the control words in the storage register 30 into the AD field of the CIR register 26, sets the CC field to CC=3, and loads the DC field with the needed timeout information. The timeout information includes a constant PTA identifying the number of counting cycles in the required timeout interval and the timer period (PTB) of each counting cycle. When the Compare circuit 54 indicates the particular addressed control word is being transferred to the BAR register, the PT field in the BAR register is loaded from the DC field of the CIR register 26 by a gate 75 in response to the output of an AND circuit 76, The AND circuit 76 senses the = condition from the Compare circuit 54, the CC=3 condition, and CS=2.

Once loaded, the PT field in the BAR register 28 identifies the timing constant PTA and the timing period PTB. As shown in FIG. 6, the PTB portion of the field is applied to a control logic circuit 345 together with the $RT_4 \rightarrow 25$ outputs of the clock counter 34. The logic circuit 345, operating in the same manner as the logic circuit 232, generates an output timing signal PTOG at any selected time interval, the interval being selected from the outputs of the clock counter 34 according to the coded value of PTB.

The output PTOG is used to count down the PTA portion of the field from its initial value to zero. This is accomplished by a subtractor circuit 346 which produces an output to the PT(W) portion of the Write bus that is one less than the input from the PTA portion of the field in BAR 28. The subtractor circuit is activated by the output of an AND circuit 347 whenever PTOG is true and PTA is not equal to 31 (an idle state) or 0. The latter conditions are derived from the decoder 102 to which the BAR register 28 is connected.

When, by this process, PTA is reduced to 0 from its initial value, a gate 349 sets PT(W)=31 on the Write bus. Also a timeout interrupt is flagged in the control word by setting BI(W) to BI=4 through a gate 350. With the BI field of the control word set to BI=4, the decoder 66 (see FIG. 4) senses the interrupt condition the next time the control word is placed on the READ bus. An AND circuit 77, in response to BI=4 and CS=0, loads the address in the AD field from clock counter 34, sets CS=1, indicating there is information for the processor, and sets CC=4. The CC=4 state is recognized by the processor as signaling the end of the timeout interval. In this manner, the processor may use the clock counter to generate on a time-shared basis as many as sixteen different time intervals for use within the processor.

What is claimed is:

1. Apparatus for controlling the transfer of digitized data between a digital processor and a plurality of separate transmission lines where the transmission lines may be terminated by different types of terminal units which transmit and receive data serially at a number of different predetermined bit rates, said apparatus comprising storage means for storing a separate control word for each transmission line, a control register for storing one such control word, clock means for simultaneously generating a plurality of periodic output signals of different frequencies, an input register, a logic network having inputs coupled respectively to the control register, the input register and the output signals of the clock means, the logic network having two outputs means continuously transferring each of the control words in sequence on successive clock cycles of the highest frequency signal of said clock source from the storage means to the control register, means coupling the output of each of the transmission line terminal units in succession to the input register in synchronism with said transfer of the control words, means coupling one output of the logic network back to the storage means, said coupling means transferring said output to each of the control word storage locations in the storage means in timed sequence in synchronism with said highest frequency clock signal, and means simultaneously coupling the other output of the logic circuit to successive ones of the transmission line units in the same sequence.

2. Apparatus as defined in claim 1, further including a buffer register, means coupling the processor to the buffer register for transferring information signals between the processor and the buffer register, the buffer register having a control portion for storing a control signal, a data portion for storing a data signal, and an address portion for storing an address signal identifying a particular one of the transmission line terminal units and the associated control word in the storage means, means responsive to the address signal stored in the address portion of the buffer register for identitying the addressed control word as it is being transferred by said transferring means from the storage means to the control register, means responsive to a first condition of the control signal established by the control portion of the buffer register for transferring the data signal stored in the data portion of the buffer register to a selected portion of the particular control word identified by said contents of control signal, and means responsive to a second condition of the control signal established by the control portion of the contents of the buffer register for transferring a selected portion of the contents of the buffer register from the particular control word identified by said identifying means to the data portion of the buffer register.

3. Apparatus as defined in claim 1 wherein the logic network includes a constant generator for generating a binary coded output signal having a value determined by the value of a coded input, each control word having a first portion identifying the type of transmission line terminal unit and a second portion including a counter for timing bit intervals, means responsive to a control word in said control register for coupling the first portion of the control word in the control register to the constant generator for generating a selected constant, means responsive to the second portion of the control word in the control register when in a first predetermined count condition for transferring the output of the constant generator to the second portion of the control word as it is restored to the storage means from the control register via said logic network, means in the logic network for decrementing the second portion of the control word in response to an input signal and means responsive to the first portion of the control word in the control register for selectively gating one of said periodic outputs from the clock means to the signal input of the decrementing means to activate the decrementing means periodically at the selected clock output frequency.

4. Apparatus as defined in claim 3, wherein said constant generator further includes means responsive to the outputs from the clock means for periodically changing the value of said binary coded output signal selected by the constant generator in response to the first portion of a coded word, the value of the output signal being changed by a predetermined increment, the interval at which the output value is changed being selected in response to the value of said first portion of the control word.

5. Apparatus as defined in claim 1, wherein each control word has first and second character storing fields, a type field an operation control field, and a timing field, the logic network including means responsive to the operation control field of a control word in the control register for identifying a transmit operation, the logic network including a translator circuit coupled to the first character field of the control register and responsive to the type field in the control register for generating an output that is a selectably modified version of the input depending on the particular type field present, and means activating the translator circuit condition of] when the control field is in a predetermined condition, the first character field contains a data character, and the second character field is empty, the output of the translator being connected by the switching means to the second character field of the control word in the storage means, whereby the translator transfers a character in the first character field in selectably modified form to the second character field.

6. A data communication control unit for interconnecting a plurality of different types of data communication units with a digital processor, comprising a plurality of separate adapter units, each unit providing an interface with one of said data communication units, each adapter unit including an output register for storing an output data bit to be transmitted by the associated communication unit and control bits, storage means for storing a group of control words, there being one control word for each adapter unit, a control register, means for continuously transferring each of the control words in succession out of the storage means into the control register at fixed equal time intervals, an input register, means synchronized with said transferring means for continuously coupling the input register to the output from each of the adapter units in succession, a buffer register, means coupling the processor to the buffer register for transferring control and data bits between the processor and the buffer register, means responsive to the buffer register for modifying a selected control word with a portion of the contents of the buffer register when the control word is transferred from the storage means to the control register, a clock counter having a plurality of periodic outputs, each output period being a different integral multiple of the period at which a particular control word is transferred out of the storage means, logic gating means coupled to the control register, the input register, and the clock counter for providing output signals to the storage means and to the adapter units, means synchronized with said transferring means for coupling one output from the logic gating means successively to each of the positions in the storage means, and means synchronized with said transferring means for coupling another output from the logic gating means successively to the output register in each of the associated adapter units.

7. A time-shared system for controlling transfer of digital data between a common source over a plurality of transmission lines where different data transfer rates may be required on each line, said system comprising: storage means for storing a plurality of digital control words, each word having a character field, a timing field, and a type field, a clocking circuit for generating a plurality of periodic output signals of different frequencies that are integral multiples of each other, a time-shared control network, switching means synchronized with the highest frequency output of the clocking circuit for connecting each of the digital control words in the storage means to the control network in repetitive sequence, and connecting each of the transmission lines to the control network in the same repetitive sequence, whereby one of the control words and an associated one of the transmission lines are connected at a time to the control network, the control network including means responsive to a predetermined state of the timing field and to the type field of each control word when it is connected to the control network for setting the timing field of the control word to some selected constant, means responsive to the type field and the outputs of the clocking circuit for periodically counting the timing field of each control word when it is connected to the control network, the counting period for the timing field of each control word being determined by the state of the type field for that control word, and means responsive to the timing field in each control word when counted to a predetermined state and connected to the control network for transferring date between the character field of the control word and corresponding transmission line.

8. Apparatus as defined in claim 7 wherein said means for setting the timing field to some selected constant further includes means responsive to the clocking circuit and the type field of the control word for periodically changing the value of the constant at selected settings.

9. A time-shared timing system comprising: storage means for storing a plurality of digital control words, each digital control word having a timing field, a type field, a clocking circuit for generating a plurality of periodic output signals of different frequencies that are integral multiples of each other, a time-shared control network, switching means synchronized with the highest frequency output of the clocking circuit for connecting each of the digital control words in the storage means to the control network in repetitive sequence at fixed equal time intervals, the control network including means responsive to a predetermined state of the timing field and to the type field of each digital control word when it is connected to the control network for setting the timing field of the control word to some selected constant, and means responsive to the type field and the outputs of the clocking circuit for periodically counting the timing field of each control word when it is connected to the control network, the counting period for the timing field of each control word being determined by the state of the type field for that control word.

10. In a digital processing system apparatus for generating a plurality of variable timeout intervals on a time-shared basis, comprising storage means for storing a plurality of separate control words, there being one coded word for each timeout interval being generated, a control register, a timer circuit for generating a plurality of periodic output signals of different frequencies, means synchronized with the highest frequency output of the timer circuit for cycling each of the control words in sequence into the control register and back into the storage means, means responsive to a first portion of a control word when in the register for selecting particular outputs from said timer, means synchronized with the selected outputs for counting down a second portion of the control word periodically as the control word is cycled through the register, and means responsive to a predetermined count condition the second portion of a control word in the register for generating an output signal indicating the completion of one of said timeout intervals.

11. Apparatus as defined in claim 10 wherein said last-named means includes means for setting a third portion of the control word to a predetermined value to indicate that the timeout interval is complete.

12. Apparatus as defined in claim 11 further including a digital processor, means for setting the first and second portion of any selected one of the control words in the storage register from the processor, and means responsive to said predetermined value of the third portion of any of said control words for signaling the processor that a particular timeout interval is complete.

* * * * *

PO-1050
(5/69)

UNITED STATES PATENT OFFICE

CERTIFICATE OF CORRECTION

Patent No. 3,618,037 Dated November 2, 1971

Inventor(s) JAMES E. WOLLUM and MILLARD J. ARVIG

It is certified that error appears in the above-identified patent and that said Letters Patent are hereby corrected as shown below:

Column 1, line 49, "required" should read --require--.

Column 2, line 9, after "and" insert --the--; line 12, "established" should read --establishes--; line 17, "filed" should read --field--.

Column 3, line 53, change the period to a comma; line 57, "filed" should read --field--.

Column 4, line 29, after "circuit" insert --48--; line 46, "FIELD" should read --field--; line 51, after "of" insert --a--; line 53, "Circuit" should read --circuit--.

Column 5, line 6, "compare" should read --Compare--; line 11, before "takes" insert --from the register 44 of the processor 10 into the CIR register 26--; line 17, change "of" to --to--; line 29, change "In" to --If--; line 33, change "set" to --the--; line 44, insert a comma after "CS=1"; line 50, change "88" to --74--; line 56, change "lie" to --line--; line 73, change "adapted" to --adapter--.

Column 6, line 9, change "FIGS" to --FIG--; line 53, change "Rine" to --Ring--; line 59, change "RING" to --Ring--.

Column 7, line 52, "CDG" should read --CDF--.

Column 8, line 3, "ANd" should read --AND--; line 20, "ture" should read --true--; line 57, "lower" should read --lowest--; line 68, "96,000" should read --9600--.

Column 9, line 10, "ANd" should read --AND--; line 45, "filed" should read --field--; line 47, "B1=1" should read --B1=0--; line 54, "1" should read --the--; line 57, "$c_1$" should read --$C_1$--; line 58, "lower" should read --lowest--.

CERTIFICATE OF CORRECTION

Patent No. 3,618,037
Dated November 2, 1971

Column 10, line 26, "manner" should read ---counter--.

Column 11, line 17, "formation" should read --information--; line 21, before "transferred" insert --to be--; line 22, delete "in the $C_2$ field to be transferred through the CIR"; line 23, delete "register"; line 44, after "reset" insert a period and add --The Data Request line CA from the Output register 42 is set--; line 49, "CDG" should read --CDF--; line 53, "AND" should read --and--.

Column 12, line 5, delete "existing" (first occurrence) and substitute therefor --the--; line 12, "s" should read --a--; line 40, "AND" should read --and--.

Column 15, line 15, delete "contents of"; line 64, delete "condition of".

Column 16, line 58, "date" should read --data--.

Signed and sealed this 4th day of July 1972.

(SEAL)
Attest:

EDWARD M.FLETCHER,JR.
Attesting Officer

ROBERT GOTTSCHALK
Commissioner of Patents